United States Patent [19]

Siegenthaler

[11] Patent Number: 5,468,319
[45] Date of Patent: Nov. 21, 1995

[54] METHOD OF SWITCHING COMPONENT ELEMENTS OF ROAD VEHICLE TIRES

[75] Inventor: Karl J. Siegenthaler, Rome, Italy

[73] Assignee: Bridgestone Corporation, Tokyo, Japan

[21] Appl. No.: 343,388

[22] Filed: Nov. 22, 1994

[30] Foreign Application Priority Data

Dec. 21, 1993 [IT] Italy ................... TO93A0982

[51] Int. Cl.⁶ .................................................. B29D 30/08
[52] U.S. Cl. ....................... 156/123; 156/130; 156/130.3; 156/421
[58] Field of Search ................................ 156/130.3, 421, 156/126, 127, 130, 406.2, 408

[56] References Cited

U.S. PATENT DOCUMENTS

| | | | |
|---|---|---|---|
| 2,341,988 | 2/1944 | Heintz | 156/421 |
| 3,056,448 | 10/1962 | Dearing | 156/421 |
| 4,738,738 | 4/1988 | Holroyd et al. | 156/127 |
| 5,207,849 | 5/1993 | Siegenthaler | 156/130.3 |
| 5,290,376 | 3/1994 | Seigenthaler | 156/130.3 |
| 5,320,695 | 6/1994 | Siegenthaler | 156/127 |

*Primary Examiner*—Geoffrey L. Knable
*Attorney, Agent, or Firm*—Carmen Santa Maria

[57] ABSTRACT

A method of stitching component elements (5) of a radial tire, whereby an inner component element (5b) is placed inside an outer component element (5a) housed inside a toroidal body (7) mounted for rotation about a horizontal axis (8) on a saddle (31) adjustable in width and supported on a carriage (6). A stitching drum (58) is inserted inside the inner component element (5b) and toroidal body (7), and is moved radially upwards to compress the outer component element (5a) between the toroidal body (7) and the inner component element (5b). The saddle (31) is widened so that the toroidal body (7) weighs on the stitching drum (58), and the toroidal body (7) and stitching drum (58) are rotated in relation to each other.

4 Claims, 2 Drawing Sheets

5,468,319

METHOD OF SWITCHING COMPONENT ELEMENTS OF ROAD VEHICLE TIRES

BACKGROUND OF THE INVENTION

1. Technical Field

The present invention relates to a method of stitching component elements of road vehicle tires.

The present invention is particularly suitable for producing the second stage assemblies of radial tires, to which specific reference is made in the following description purely by way of example, and for assembling first stage to second stage assemblies.

2. Background Information

According to European Patent Application publication no. 0540048 filed by the present Applicant, a radial tire is produced by forming the second stage assembly of the tire on the inner surface of a toroidal body; separately forming the first stage assembly of the tire on inner rings supporting the bead portions of the first stage assembly; placing the first stage assembly inside the toroidal body and on the inner surface of the second stage assembly; forming the sidewalls of the tire, which are placed on the first stage assembly; and assembling annular walls for connecting the toroidal body and inner rings and so forming a mold suitable for use as a curing mold.

SUMMARY OF THE INVENTION

It is an object of the present invention to provide a straightforward, relatively low-cost stitching method for achieving substantially perfect adhesion of pairs of mutually contacting component elements of tires produced as described above.

According to the present invention, there is provided a method of stitching component elements of road vehicle tires. The method comprises stages consisting in placing a first component element inside a second component element housed inside a hollow body with adjustable supporting means; inserting stitching means inside the first component element and the hollow body; moving the stitching means into a raised position to engage the first element and compress the second element between the first element and the hollow body; adjusting said supporting means so that the hollow body weighs at least partly on the stitching means; and rolling the stitching means in contact with the first element.

Preferably, in the above method, said supporting means comprise a roller saddle of adjustable width; and said hollow body comprises a toroidal body mounted on the roller saddle so as to rotate about a substantially horizontal axis. The toroidal body is caused to weigh at least partly on the stitching means by increasing the width of the saddle.

BRIEF DESCRIPTION OF THE DRAWINGS

A non-limiting embodiment of the present invention will be described by way of example with reference to the accompanying drawings, in which.

DESCRIPTION OF THE PREFERRED EMBODIMENT

Figure 1:
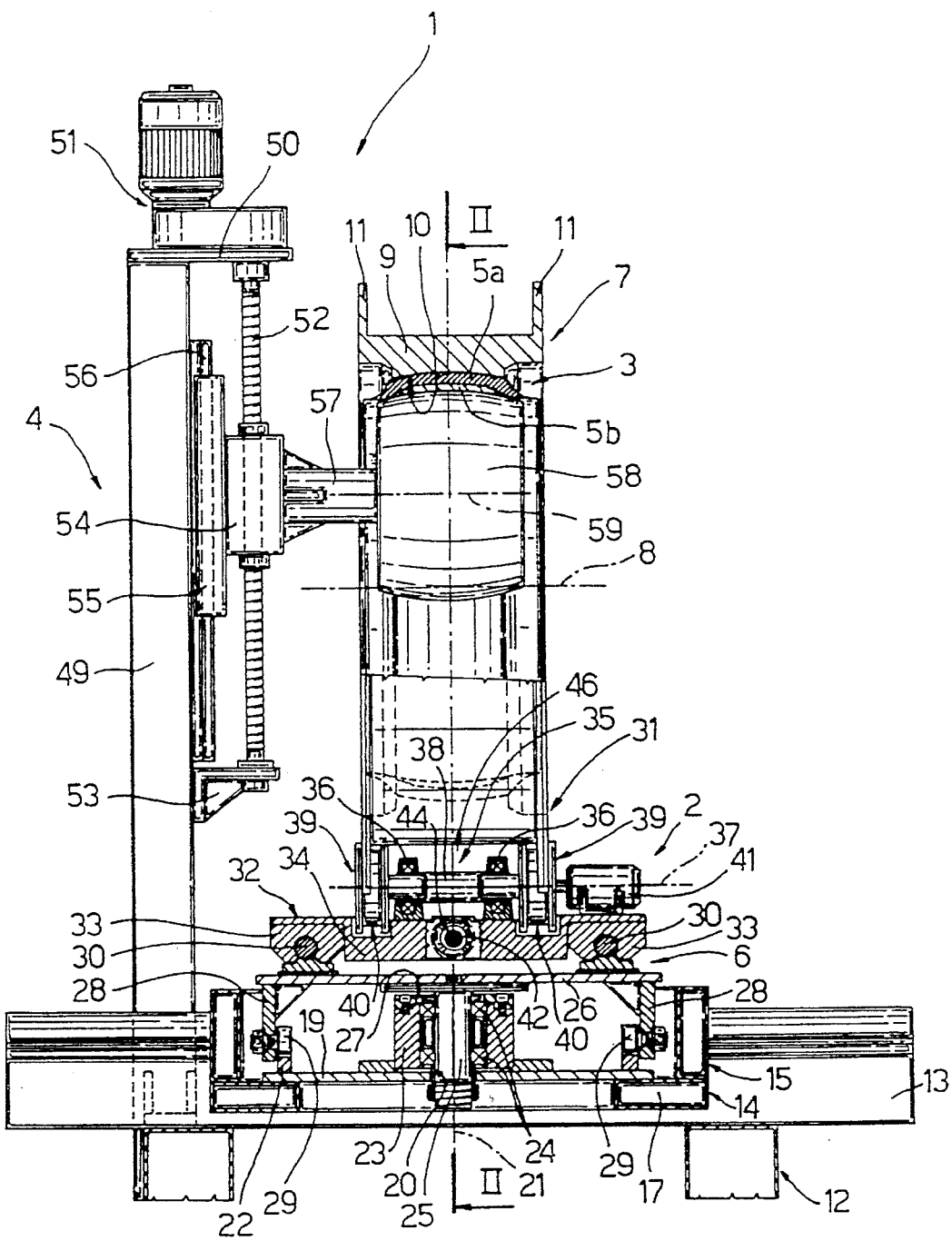
FIG. 1 shows an axial section of a stitching unit implementing the method according to the present invention.

Number 1 in FIG. 1 indicates a stitching station for a radial tire (not shown), defined by a device 2 for forming and transferring a second stage assembly, i.e. tread assembly, 3; and by a stitching device 4 for ensuring the mutual cohesion of two annular component elements 5 of assembly 3, consisting respectively of a tread 5a and a tread belt 5b.

Device 2 comprises a carriage 6; and a toroidal body 7 supported on carriage 6 with its axis 8 arranged substantially horizontally, and in turn comprising an intermediate annular body 9 for housing assembly 3. Annular body 9 is externally cylindrical, and is defined internally by an annular surface 10 having a curved inwardly-concave section and designed to contact the outer surface of assembly 3. Toroidal body 7 also comprises two outer annular flanges 11 extending radially outwards from the opposite axial ends of annular body 9.

In addition to carriage 6 and toroidal body 7, device 2 also comprises a fixed frame 12, and two parallel rails 13 supported in a fixed position on frame 12, and in turn supporting carriage 6 in a sliding manner.

Figure 2:
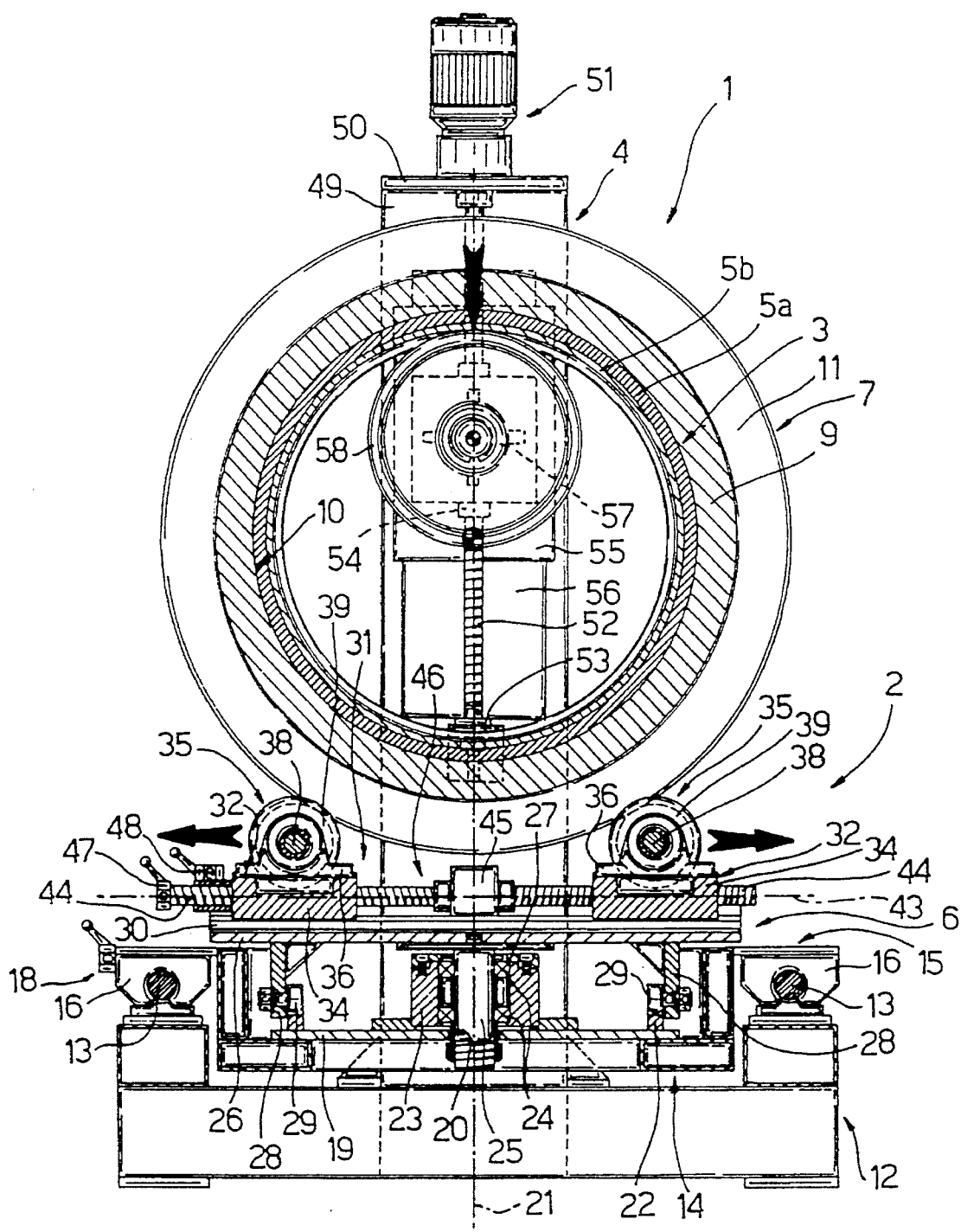
FIG. 2 shows a section along line II—II in FIG. 1.

As shown more clearly in FIG. 2, carriage 6 comprises a base 14, in turn comprising two parallel cross members 15 perpendicular to rails 13, each presenting two end shoes 16 fitted in a sliding manner to rails 13, and a horizontal platform 17 between shoes 16 and facing the other cross member 15. Base 14 also comprises two lock devices 18 for fixing base 14 to rails 13 in any given position; and a horizontal plate 19 having opposite peripheral portions resting on and connected integral with platforms 17, and which presents a central hole 20 with a vertical axis 21, and an upper annular rib 22 extending about hole 20 and coaxial with axis 21. Upwards from plate 19, there extends a tubular body 23 connected integral with plate 19, coaxial with axis 21 and hole 20, and which is engaged, together with hole 20 and via the interposition of radial bearings 24, by a pin 25 extending downwards from a substantially rectangular platform 26 connected for rotation to the top free end of body 23 via the interposition of a thrust bearing 27. From the bottom surface of platform 26, there extend downwards four brackets 28 equally spaced about axis 21, each supporting a roller 29 running along an annular track coaxial with axis 21 and defined by the annular top end surface of rib 22.

The top surface of platform 26 is fitted integral with two substantially horizontal rails 30 symmetrical in relation to axis 21 and supporting in a sliding manner a saddle 31, in turn supporting toroidal body 7. Saddle 31 comprises two parallel cross members 32 perpendicular to rails 30, each presenting two end shoes 33 connected in a sliding manner to rails 30, and a horizontal platform 34 between shoes 33. The top surface of each platform 34 is fitted integral with a roller support 35 comprising two supports 36 aligned along a respective axis 37 parallel to respective cross member 32. Via the interposition of respective bearings, supports 36 support for rotation a shaft 38, the opposite ends of which project outwards of supports 36 and are fitted with respective rollers 39, each coaxial with respective axis 37 and having a groove 40. One of shafts 38 may be connected to the output of a motor 41 supported on a respective shoe 33. As shown in FIG. 1, the length of shaft 38 is such that the distance between grooves 40 on rollers 39 of each roller support 35, equals that between the two flanges 11.

As shown in FIG. 2, cross members 32 are fitted through with respective nut screws 42 coaxial with each other along an axis 43 extending transversely to axes 37, and are engaged by respective oppositely threaded screws 44 connected at one end by a central block 45. Nut screws 42 and screws 44 constitute a device 46 for adjusting the width of saddle 31 within a given range, and which presents an external control handle 47 fitted to one of the screws 44, and a releasable lock device 48 for preventing rotation of screws 44.

As shown in FIG. 2, toroidal body 7 is placed on saddle 31 with each flange 11 engaged inside the grooves 40 of two rollers 39, so that it can be moved along its own axis 8 by moving carriage 6 along rails 13; rotated about axis 8 by means of motor 41; adjusted manually about axis 21 (or by means of a known motor, not shown, connected to pin 25); and moved, by means of device 46, transversely in relation to axis 8 and in the direction of axis 21.

Stitching device 4 comprises an upright 49 fitted at the bottom end to frame 12, between rails 13, and fitted at the top end with a plate 50 supporting a geared motor 51, with an output screw 52 extending parallel to upright 49 and between plate 50 and a lateral bracket 53 on upright 49. Screw 52 is fitted with a nut screw 54, the lateral surface of which is fitted integral with a slide 55 connected in a sliding manner to a guide 56 parallel to and integral with upright 49, so that, when geared motor 51 is operated, nut screw 54 travels, without rotating, along upright 49. On the opposite side to slide 55, nut screw 54 is fitted with a shaft 57, in turn fitted in an idle manner with a stitching drum 58 having an axis of rotation 59 parallel to axis 8. Alternatively, shaft 57 is tubular and houses a motor (not shown), the output shaft (not shown) of which is fitted with drum 58.

In actual use, following insertion of tread belt 5b inside tread 5a contacting surface 10 of toroidal body 7, carriage 6 is moved along rails 13 so as to insert drum 58, initially positioned with axis 59 coaxial with axis 8, inside toroidal body 7.

Motor 51 is then operated to raise drum 58, so as to bring its outer surface into contact with the inner surface of tread belt 5b, and compress tread 5a between tread belt 5b and surface 10. At this point, adjusting device 46 is activated by means of handle 47 to slightly widen saddle 31, so that toroidal body 7 weighs partly on drum 58, thus increasing by the force of gravity the contact pressure between elements 5, but without detaching toroidal body 7 from rollers 39 which are rotated by motor 41 so as to rotate toroidal body 7 in relation to drum 58, and so stitch tread belt 5b on to tread 5a.

Station 1, which in the non-limiting example shown provides for internally stitching second stage assembly 3, may of course be used in exactly the same way as described above for internally stitching assembly 3 to a first stage assembly, i.e. carcass, not shown.

From the foregoing description and the operational discussion, when read in light of the several drawings, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and scope of the invention with the latter being determined solely by reference to the claims appended hereto.

I claim:

1. A method of stitching component elements of road vehicle tires; the method comprising stages consisting in placing a first component element inside a second component element housed inside a hollow body with adjustable supporting means; inserting stitching means inside the first component element and the hollow body; moving the stitching means into a raised position to engage the first element and compress the second element between the first element and the hollow body; adjusting said supporting means so that the hollow body weighs at least partly on the stitching means; and rolling the stitching means in contact with the first element.

2. A method as claimed in claim 1, in which said supporting means comprise a roller saddle of adjustable width; and said hollow body comprises a toroidal body mounted on the roller saddle so as to rotate about a substantially horizontal axis; the toroidal body being caused to weigh at least partly on the stitching means by increasing the width of the saddle.

3. A method as claimed in claim 2, in which the stitching means are rolled in contact with the first element by rotating the toroidal body about said axis.

4. A method as claimed in claim 1, in which the stitching means comprises a drum rotating about its axis; the drum being moved transversely to said axis into said raised position.

* * * * *